United States Patent
Hagemann

[15] 3,699,162
[45] *Oct. 17, 1972

[54] REACTION OF PHOSGENE AND CYANOGEN CHLORIDE

[72] Inventor: Hermann Hagemann, Cologne, Germany

[73] Assignee: Farbenfabriken Bayer Aktiengesellschaft, Leverkusen, Germany

[ * ] Notice: The portion of the term of this patent subsequent to Aug. 17, 1988, has been disclaimed.

[22] Filed: Dec. 15, 1969

[21] Appl. No.: 884,895

Related U.S. Application Data

[63] Continuation-in-part of Ser. No. 731,284, May 22, 1968, Pat. No. 3,600,439.

[30] Foreign Application Priority Data

Jan. 7, 1969 Germany..........P 19 00 542.6

[52] U.S. Cl. ...........................260/544 C, 260/553 R
[51] Int. Cl..............................................C07c 51/58
[58] Field of Search ......................260/544 C, 553 R

[56] References Cited

UNITED STATES PATENTS 3,600,439  8/1971  Hagemann.............260/553 R

Primary Examiner—Lorraine A. Weinberger
Assistant Examiner—Richard D. Kelly
Attorney—Burgess, Dinklage & Sprung

[57] ABSTRACT

Phosgene and cyanogen chloride are reacted under pressure in the liquid phase over an activated charcoal catalyst at 100° to 250° C to produce a mixture of chlorocarbonylisocyanide and carbonyl-bis-(N-isocyanide dichloride).

3 Claims, 1 Drawing Figure

PATENTED OCT 17 1972 3,699,162
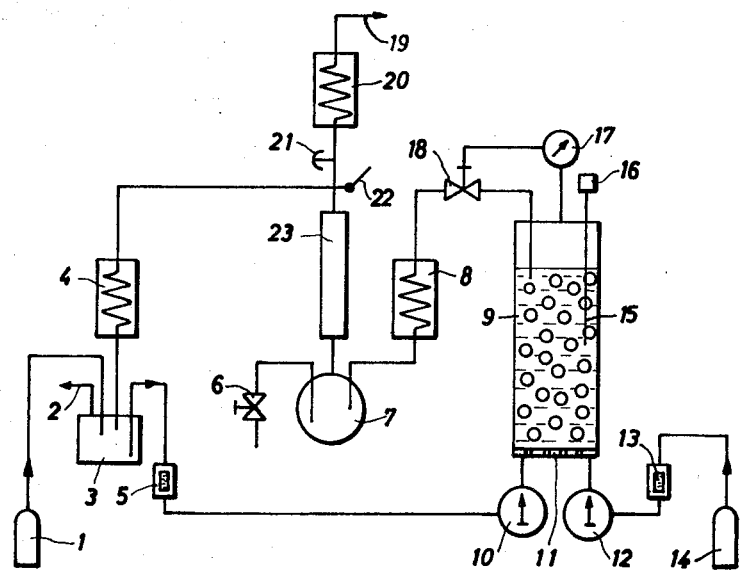
INVENTOR.
HERMANN HAGEMANN
BY
Burgess, Dinklage & Sprung

REACTION OF PHOSGENE AND CYANOGEN CHLORIDE

RELATED APPLICATION

This application is a continuation-in-part of Process for the Preparation of a Mixture of N-Chlorocarbonyl-Isocyanide Dichloride and Carbonyl-bis-(N-Isocyanide Dichloride), and the Corresponding Thio Compounds, Ser. No. 731,284, filed May 22, 1968, now U.S. Pat. No. 3,600,439.

PREAMBLE

Certain highly activated acyl chlorides are capable of undergoing addition with cyanogen chloride at temperatures of only 50°C and 5 excess atmospheres without the use of a catalyst to form acylisocyanide dichlorides, but these acylisocyanide dichlorides are subject to decomposition even at room temperature under normal pressure and revert to the starting compounds. At elevated temperatures, this equilibrium shifts completely in favor of the decomposition products due to trimerisation of cyanogen chloride.

N-chlorocarbonylisocyanide dichloride can be obtained along with carbonyl-bis-(N-isocyanide dichloride) if cyanogen chloride is reacted in the absence of Lewis acids with a compound of the formula:

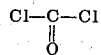

of 5 to 100 atmospheres and a temperature of 100° to 300°C in the presence of activated charcoal, the isocyanide dichlorides formed being removed by distillation. An inert solvent and/or an inert gas can be present if desired.

The solvents which may optionally be employed for the process are chlorinated hydrocarbons such as methylene chloride, chloroform, carbon tetrachloride, chlorobenzene and dichlorobenzene and also hexachloroethane. If the process is carried out in the presence of an inert gas, it is to be understood that this gas may be carbon dioxide or, in particular, nitrogen. The usual activated charcoals of commerce can be used for the process of the invention. Examples include, inter alia, the kinds of active charcoal mentioned in Ullmann's Enzyklopadie der Technischen Chemie, 3rd Edition, and by Kirk Othmer.

The compounds obtainable by the above process correspond to the general formula:

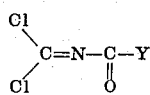

in which Y represents chlorine (compound (I)) or the radical:

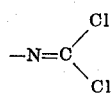

(compound (II)).

To increase the proportion of the compound (I), phosgene is used in the reaction in at least stoichiometric quantity and preferably in excess, a 2 to 10 and preferably 3 to 5 times molar excess being generally employed. In order to increase the proportion of the compound (II) formed in the reaction, cyanogen chloride is used in excess in analogous manner. It may be advantageous, especially in the latter case, to carry out the reaction in the presence of one of the above-mentioned inert organic solvents.

THIS INVENTION

The present invention provides a continuous process for the preparation of N-chlorocarbonylisocyanide dichloride along with carbonyl-bis-(N-isocyanide dichloride) by reacting in the liquid phase cyanogen chloride with phosgene with the exclusion of Lewis acids over active charcoal at an elevated pressure and optionally in the presence of an inert gas. The reactants are conducted continuously in the liquid phase at a temperature of from 100° to 250°C over active charcoal arranged in a fixed bed, the flow rate being from 1 to 5 parts by volume of the liquid mixture of cyanogen chloride and phosgene under pressure for every part by volume of active charcoal per hour. The isocyanide dichlorides formed are removed from the reaction product as by distillation and the cyanogen chloride and phosgene recovered are returned to the process.

The process is carried out in the temperature range of 100° to 250°C, in particular, 130° to 180°C. A pressure of 5 to 100 and, in particular, 47 to 75 atmospheres is maintained in the reactor. The reactor can be a fixed bed reactor or a fluidized bed reactor. The process has the advantage that it can be carried out without solvents. The catalyst can be pretreated by passing an inert gas such as carbon dioxide or nitrogen at the reaction temperature over the catalyst in the reactor. The active charcoal used may be any of the usual active charcoals of commerce in granulated form or, if the reactor is constructed as a fluidized bed, in powder form.

The process according to the invention has the advantage that it produces N-chlorocarbonylisocyanide dichlorides in a high yield and with a high selectivity and high conversion of the cyanogen chloride. Conversion and yield are surprisingly substantially higher in the continuous process according to this invention than in the discontinuous process. Another very surprising feature is that, in the process according to this invention, the expected trimerisation of cyanogen chloride to cyanuric chloride can be observed only to a very slight extent. Even after the process has been in operation for long periods, the proportion of cyanuric chloride in the reaction mixture still remains surprisingly low. One obtains either a larger amount of chlorocarbonyl isocyanide dichloride or a larger amount of carbonyl-bis-(N-isocyanide dichloride) in the process according to which, of the two starting components, cyanogen chloride or phosgene, is used in excess.

The new types of compounds obtainable by the process according to the invention can be used in the same way for further reactions as has already been described for the known isocyanide dichlorides. Furthermore, they may be used for the production of synthetic resin auxiliary products, plant protection agents or material protection agents. They may also be used directly as plant protection agents or material protection agents.

DRAWING

The drawing is a schematic illustration of the process described in the Example.

EXAMPLE

One part by volume of granulated active charcoal is introduced into a reactor 15. Nitrogen introduced through a valve in the bottom plate 11 of the reactor is blown through the active charcoal and the temperature in the reactor is raised to 150°C. As soon as moisture ceases to escape from the active charcoal through a cooler 8 connected to the reactor, the nitrogen pressure is raised to 10 atmospheres. Phosgene is now fed from a storage vessel 1 into the reactor 15 through an atomizer plate in the bottom plate 11 of the reactor via a pump 10 and a calibrating device 5. Cyanogen chloride is introduced from a storage vessel 14 by a pump 12 via a dosing device 13. At the same time, the temperature, which is controlled by an internal thermometer 16 in the reactor, is maintained at 150°C. The pressure is allowed to rise to 55 atmospheres. At 55 atmospheres, the pressurized gas is released into the cooler 8 by means of an automatically controlled valve arrangement 17, 18. The cooler 8 is so designed that it cools the reaction product to a temperature range of from 50° to 70°C. The reaction reaction product enters a container 7 which is maintained at 65°C by external heating means. Phosgene is distilled off through a column 23 equipped with a cooler 20 and a reflux divider 21, and enters a container 3 via a cooler 4 which, like the cooler 20, is cooled with brine at −20°C. The crude product can be removed discontinuously or continuously from the container 7 by a siphon 6. Permanent gases, e.g. from the preparation of the catalyst, can be removed from the cooler 20 at 19. The container 3 can be replenished with phosgene from the storage container 1 as required. The phosgene returns to the reaction cycle from the container 3.

1.485 parts by weight of phosgene and 183 parts of cyanogen chloride are fed into the reactor 15 per hour. After a period of operation of 12.6 hours, 5,331 parts of chlorocarbonyl isocyanide dichloride (i.e. 89 weight percent of the theoretical), 492 parts by weight of carbonyl-bis-(N-isocyanide dichloride) (i.e. 5.9 weight percent of the theoretical) and 120 parts of cyanuric chloride (i.e. 5.2 weight percent of the theoretical) are obtained. Conversion of cyanogen chloride is 97 weight percent after about 100 hours. Unreacted cyanogen chloride can be returned into circulation via the container 3 together with phosgene, so that the proportion of fresh cyanogen chloride to be added via the pump 12, can be reduced.

Conversion into the corresponding isocyanate is carried out as follows:

229.5 g (1.43 mol) of N-chlorocarbonylisocyanide dichloride are introduced into the reaction vessel and 137.5 g (1.43 mol) of methylsulphonic acid are added dropwise at 20°C at such a rate that the reaction temperature rises to 50°C. Thereafter hydrogen chloride which is bound in the form of carbamic acid chloride is driven off over a column in the course of about 5 hours while the sump temperature is slowly raised, and the N-chlorocarbonyl isocyanate remaining behind is separated from methyl sulphochloride by distillation. 106 g (=70% of the theoretical) of N-chlorocarbonyl isocyanate of b.p. 64°C/760 mm Hg are obtained.

I claim:

1. In a continuous process for the preparation of N-chlorocarbonyl-isocyanide dichloride and carbonyl-bis-(N-isocyanide dichloride) by reacting cyanogen chloride and phosgene with the exclusion of Lewis acids over active charcoal at an elevated pressure and temperature; the improvement which comprises passing in liquid phase a mixture of cyanogen chloride and phosgene at a temperature of from 100° to 250°C over active charcoal arranged as a fixed bed and a flow rate being from 1 to 5 parts by volume of the liquid mixture of cyanogen chloride and phosgene per part by weight of active charcoal per hour; removing the isocyanide dichlorides thus formed and unreacted feed from the product reaction mixture; and returning unreacted cyanogen chloride and phosgene thus recovered to the process.

2. The process of claim 1 wherein an inert gas is added to the reaction mixture.

3. The process of claim 1 wherein the ratio of isocyanide dichlorides in said product reaction mixture is controlled by adjusting the ratio of said phosgene and cyanogen chloride in the feed.

* * * * *

UNITED STATES PATENT OFFICE
CERTIFICATE OF CORRECTION

Patent No. 3,699,162      Dated October 17, 1972

Inventor(s) HERMANN HAGEMANN

It is certified that error appears in the above-identified patent and that said Letters Patent are hereby corrected as shown below:

Cover page, under the heading "Foreign Application Priority Date" insert --Aug. 30, 1967 Germany ..... F 53 353--; column 3, line 20, "reactor 15" should be --reactor 9--; column 3, line 26, after "mometer" insert --15,--column 3, line 32, cancel "reaction" (2nd occurrence); column 3, line 45, after "183 parts" insert --by weight; column 3, line 47, after "5,331 parts" insert --by weight--; column 3, line 48, cancel "weight"; column 4, line 2, cancel "weight"; column 4, line 4, cancel "weight"; column 4, line 5, cancel "weight"; column 4, line 3, after "120 parts" insert --by weight--; column 3, line 36, after "container 3" insert --having a vent line 2 by way of valve 22--

Signed and sealed this 24th day of April 1973.

(SEAL)
Attest:

EDWARD M. FLETCHER, JR.      ROBERT GOTTSCHALK
Attesting Officer      Commissioner of Patents